UNITED STATES PATENT OFFICE.

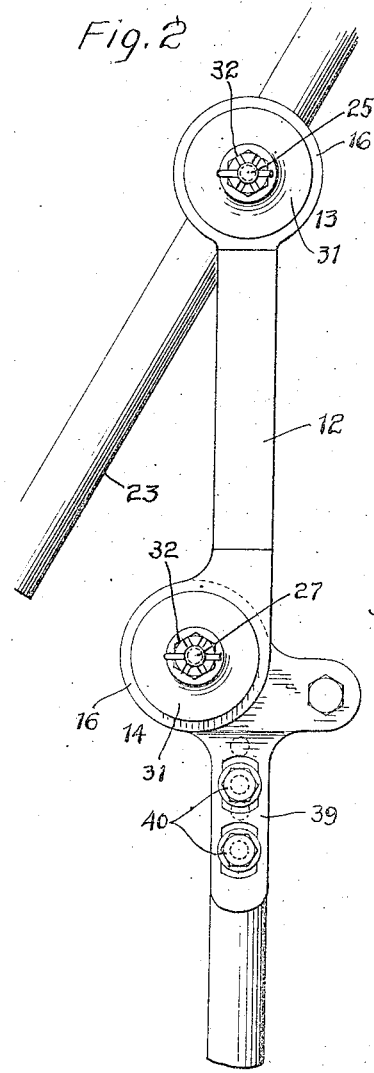
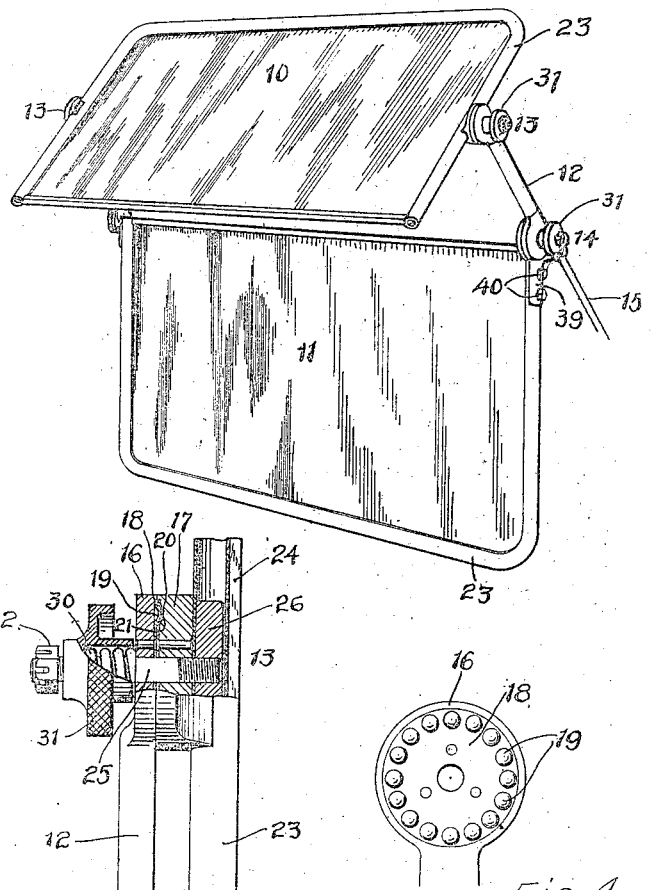
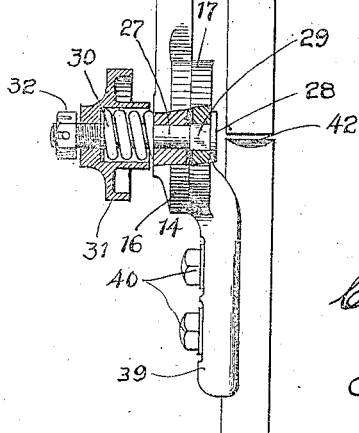

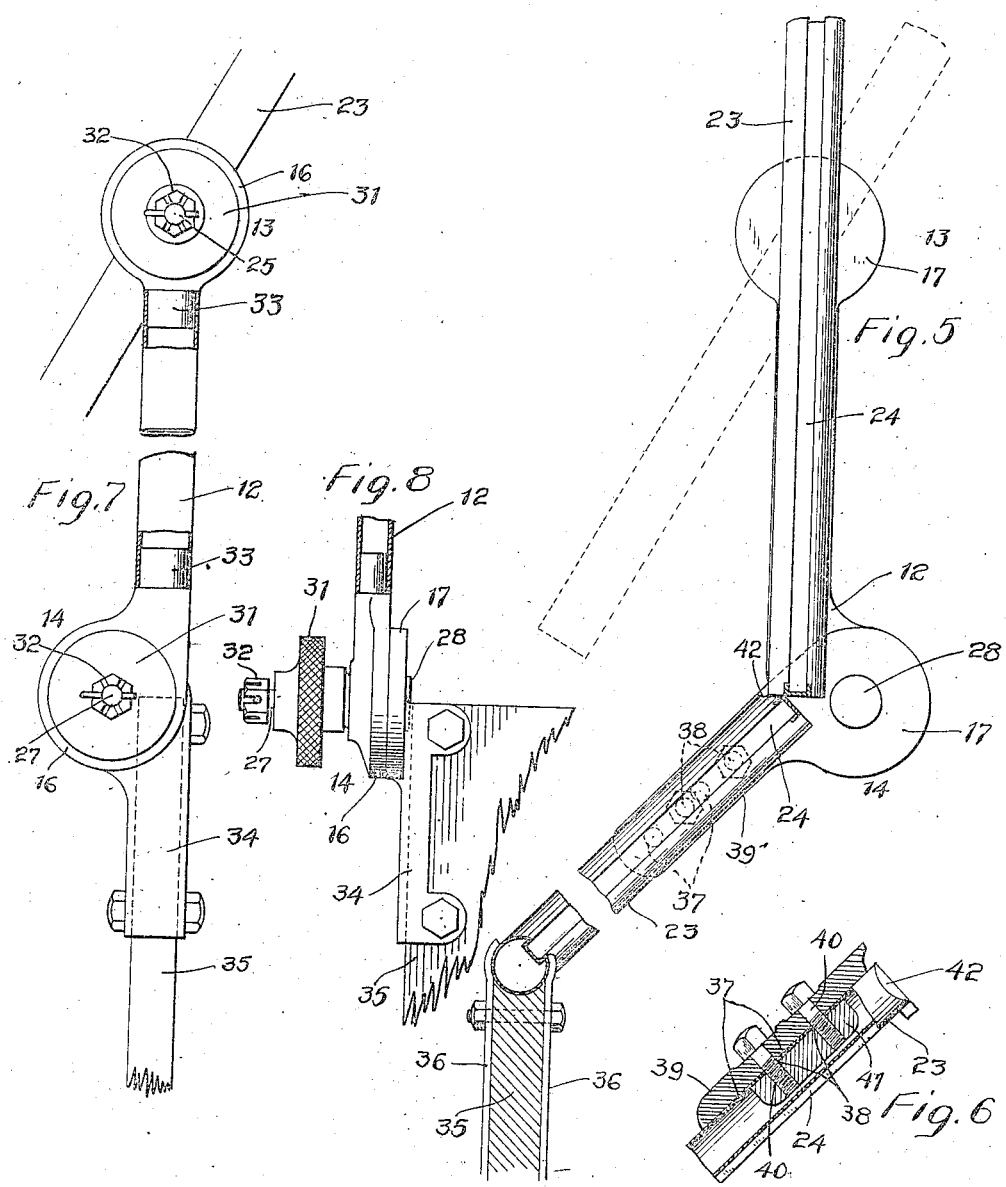

CHARLES H. JOCKMUS, OF ANSONIA, CONNECTICUT.

WIND-SHIELD HINGE.

1,069,955.

Specification of Letters Patent.   Patented Aug. 12, 1913.

Application filed April 3, 1912.   Serial No. 688,175.

*To all whom it may concern:*

Be it known that I, CHARLES H. JOCKMUS, a citizen of the United States, residing at Ansonia, county of New Haven, State of Connecticut, have invented an Improvement in Wind-Shield Hinges, of which the following is a specification.

This invention has for its object to provide a hinge adapted for general use upon wind shields and especially adapted for use upon the type of wind shields in which the upper member is carried by a swinging arm, my novel hinge being adapted to connect the upper member to the swinging arm and also to connect the swinging arm to the lower member in such a manner as to securely retain either member in any position in which it may be placed.

A further object of the invention is to provide means for adjustably attaching the lower hinge to the lower member in such a manner as to permit the lower member to be shifted from the ordinary or upright position to the inclined or zigzag position, so called, without leaving an open joint between the members.

With these and other objects in view, I have devised the novel wind shield hinge which I will now describe, referring to the accompanying drawings forming a part of this specification and using reference characters to indicate the several parts.

Figure 1 is a perspective of a wind shield illustrating the use of my novel hinge, the lower member of the shield being in the ordinary position, the swinging arms inclined backward and the upper member inclined forward; Fig. 2, a side elevation on an enlarged scale showing the upper and lower hinges, the swinging arm and portions of the wind shield members in edge view, the swinging arm being in the vertical position; Fig. 3, an elevation partly in vertical section, as seen from the right in Fig. 2, the upper member being in the vertical position; Fig. 4, a face view of one of the hinge members detached; Fig. 5, an elevation as seen from the reverse point of view from Fig. 2, showing the lower member in the zigzag position, so called, the glasses being removed; Fig. 6, a detail sectional view of the upper end of the lower frame; Fig. 7, an elevation corresponding with Fig. 2, showing the use of my novel hinge in attaching a one-piece shield carried by swinging arms to a filler-in board; and Fig. 8 is an elevation as seen from the right in Fig. 7.

10 denotes the upper member of a wind shield, 11 the lower member, 12 the swinging arms, 13 the upper hinge, 14 the lower hinge, and 15 a brace rod extending from the lower hinge to a fixed portion of the car (not shown).

The essential features of the hinge are the same whether it is used for attaching the upper member to the swinging arm or the swinging arms to a lower member or to a filler-in board, but the means for attaching the hinge must necessarily vary in hinges for different uses. Each hinge comprises two heads indicated respectively by 16 and 17. Head 16 is provided with a recess in its face to receive a hardened disk 18 which is provided with a series of rounded bumps or lugs 19 in circular arrangement (see Fig. 4). Head 17 is provided with a corresponding recess to receive a hardened disk 20 which is provided with rounded depressions 21 which correspond with and closely receive the bumps or lugs on the other disk, the two disks being riveted or otherwise rigidly secured in the depressions. Hinge member 16 is adapted to turn on a stud which is fixed in the other member. The glasses of the members are seated in frames 23, ordinarily made of brass tubing, which are provided with grooves or channels 24 to receive them.

25 denotes the stud of the upper hinge which passes freely through head 16, is threaded to engage head 17 and also passes into the frame 23 where it engages a nut 26.

27 denotes the stud of the lower hinge which is provided with a head 28 which engages the inner side of head 17 and with an angular portion 29, which passes through head 17 and retains the stud against rotation.

In use, the hinge members are locked in any position in which they may be placed by means of a relatively strong spring 30 which is socketed in a nut 31 and bears against the base of the socket and against the outer member of the hinge. The tension of the spring is regulated by turning the nut inward or outward on the stud. In order to limit the outward movement of the nut, I provide as a stop therefor, a castellated nut 23. In addition to preventing detachment of the parts, this stop renders it impossible to reduce the pressure of the spring below a predetermined minimum; that is, it prevents nut 31 from being turned backward far enough to relieve the pressure of the spring sufficiently to permit the hinge members to turn without locking. In order to convert the frictional lock of the bumps and depressions into a positive lock, it is simply required to turn nut 31 inward until the coils of the spring are compressed into contact, making the spring a rigid tube, which positively locks the bumps in engagement with the depressions. Nut 31 does not require to be moved in ordinary use. In setting up, the nuts are adjusted to place the necessary tension upon the springs to securely lock the hinge members and with them the shield members in any position in which they may be placed, at the same time leaving it within the power of the operator to change the position of the swinging arm or the upper member of a shield by applying sufficient power to the shield member with one hand to overcome the tension of the springs and permit the bumps or lugs on the disks to be moved out of the depressions in which they have been seated and into other depressions, the springs instantly locking the hinge members and the shield members in the position in which they are placed, thereby locking the shield members so securely in place that they will not ordinarily be jarred out of place when traveling at high speed on rough roads the lock is made positive, as already explained, by turning nut 31 inward.

The swinging arms are tubes and the corresponding hinge members are provided with hubs 33 which tightly engage the ends of the tubes as clearly shown in Figs. 2 and 7. Where a one-member shield is attached directly to a filler-in board, one member of the hinge has formed integral therewith a clip 34 which is bolted directly to the filler-in board, indicated by 35 (see Figs. 7 and 8). Where a two-member shield is used it should be attached to the filler-in board in some way that will permit the lower member to be changed from the vertical to the zigzag position and vice versa. For this purpose, I preferably use the wind shield clamp described and claimed in my Patent Number 1,015,386, dated January 23, 1912, and which in the present instance I have indicated by 36. In order that the shield members may be retained in engagement, that is so that there may be no open joint between the shield members in either the zigzag or ordinary position, I provide screw holes, indicated by 37 and 38, in the frame of the lower shield member and attach the lower hinge to the lower shield member by means of an arm 39 extending from one member of the hinge. This arm is secured to the frame of the lower shield member by screws 40 which pass through either holes 37 or 38 and engage a block 41 lying within the frame. When the members are to be locked in the ordinary or vertical position, screws 40 are passed through holes 37 and the inner ends of the frames of the upper and lower shield members will lie close together. In order to provide for the inclined or zigzag position of the lower member, as in Fig. 5, I bevel the ends of the frame of the lower member, as at 42. In changing from the ordinary to the zigzag position, screws 40 are removed from holes 37 and are passed through holes 38. The lower ends of the frame of the upper member in the adjusted position will lie in engagement with the bevels, as clearly shown in Fig. 5, and an open joint between the shield members will be avoided.

Having thus described my invention I claim:

A hinge of the character described comprising members provided respectively with bumps and depressions, a stud fixed in one member and upon which the other turns, a spring by which the members are retained in yielding engagement, a nut for regulating the pressure of the spring and for making the engagement positive and a castellated nut to prevent reduction of the spring pressure below a predetermined minimum.

In testimony whereof I affix my signature in presence of two witnesses.

CHARLES H. JOCKMUS.

Witnesses:
GEORGE T. SAMPSON,
FRED W. FISHER.